(12) United States Patent
Tsai (10) Patent No.: US 8,482,888 B2
(45) Date of Patent: Jul. 9, 2013

(54) ESD BLOCK WITH SHARED NOISE OPTIMIZATION AND CDM ESD PROTECTION FOR RF CIRCUITS

(75) Inventor: Ming-Hsien Tsai, Sindian (TW)

(73) Assignee: Taiwan Semiconductor Manufacturing Co. Ltd., Hsin-chu (TW)

( * ) Notice: Subject to any disclaimer, the term of this patent is extended or adjusted under 35 U.S.C. 154(b) by 442 days.

(21) Appl. No.: 12/783,842

(22) Filed: May 20, 2010

(65) Prior Publication Data

US 2011/0286136 A1 Nov. 24, 2011

(51) Int. Cl.
*H02H 9/00* (2006.01)

(52) U.S. Cl.
USPC .......................................................... 361/56

(58) Field of Classification Search
USPC .......................................................... 361/56
See application file for complete search history.

(56) References Cited

U.S. PATENT DOCUMENTS

| 6,885,534 | B2 * | 4/2005 | Ker et al. ..................... 361/113 |
| 2003/0102923 | A1 | 6/2003 | Vickram et al. |
| 2007/0058308 | A1 | 3/2007 | Thijs et al. |
| 2010/0103572 | A1 | 4/2010 | Worley |

FOREIGN PATENT DOCUMENTS

EP 2148434 A1 1/2010

OTHER PUBLICATIONS

Belostotski, L. et al., "Noise Figure Optimization of Inductively Degenerated CMOS LNAs With Integrated Gate Inductors", IEEE Transactions on Circuits and Systems-I:Regular Papers, Jul. 2006, 53(7):1409-1422.
Tsai, M.H. et al., "A Low Noise Amplifier Co-designed with EDS Protection Circuit in 65-nm CMOS", Microwave Symposium Digest, Jun. 2009, pp. 573-576.
"Electrostatic Discharge (ESD) Technology Roadmap", ESD Association, Mar. 4, 2005, pp. 1-7.
Ashton, R., "EMC Field-Induced Charged Device Model: What Really Happens", Conformity, Mar. 1, 2008, pp. 1-5.
Office Action dated Apr. 22, 2013 in related Chinese Application No. 201010514014.7.

* cited by examiner

*Primary Examiner* — Stephen W Jackson
(74) *Attorney, Agent, or Firm* — Duane Morris LLP (57) ABSTRACT

A RF device includes a RF integrated circuit having a RF input and a RF output. The RF integrated circuit has an NMOS transistor having a gate terminal coupled to the RF input, a drain terminal coupled to a first power supply node and a source terminal coupled to a second power supply node. The RF integrated circuit is vulnerable to damage from an ESD event. A primary ESD protection circuit is coupled to the RF input and between the first and second power supply nodes. A secondary ESD protection circuit is coupled between the RF input and the second power supply node. The secondary ESD protection circuit includes a secondary ESD protection diode coupled between the gate and source terminals of the NMOS transistor.

20 Claims, 8 Drawing Sheets

ESD BLOCK WITH SHARED NOISE OPTIMIZATION AND CDM ESD PROTECTION FOR RF CIRCUITS

FIELD OF THE INVENTION

The present invention relates to integrated circuit (IC) designs having ESD protection, and more specifically to IC designs having charge device model (CDM) ESD protection.

BACKGROUND OF THE INVENTION

Field induced charge device model (CDM) damage from an electrostatic field occurs when a charged item it brought into close proximity to an electrostatic discharge (ESD) sensitive device and the device is then grounded while in the presence of the field. Effective ESD control programs ensure that process-required insulators will not induce damaging voltage levels onto the devices being handled.

CDM emulates an integrated circuit that becomes charged during handling and discharges to a grounded metallic surface. The capacitance is the capacitance of the integrated circuit to its surroundings and the discharge path is a pin of the IC directly to a grounded surface. The test method for CDM must have a capacitance that scales with the device under test's (DUT) capacitance and a discharge path with very little impedance other than the DUT's own pin impedance. The peak current for CDM ESD is larger than other ESD models, e.g., human body model (HBM).

Existing conventional ESD protection schemes for internal logic circuits degrade RF circuit performance. This occurs because the ESD-induced parasitic capacitance negatively impacts an input matching network in RF front-end circuits such as a low-noise amplifiers, especially for millimeter wave IC applications.

Figure 1:
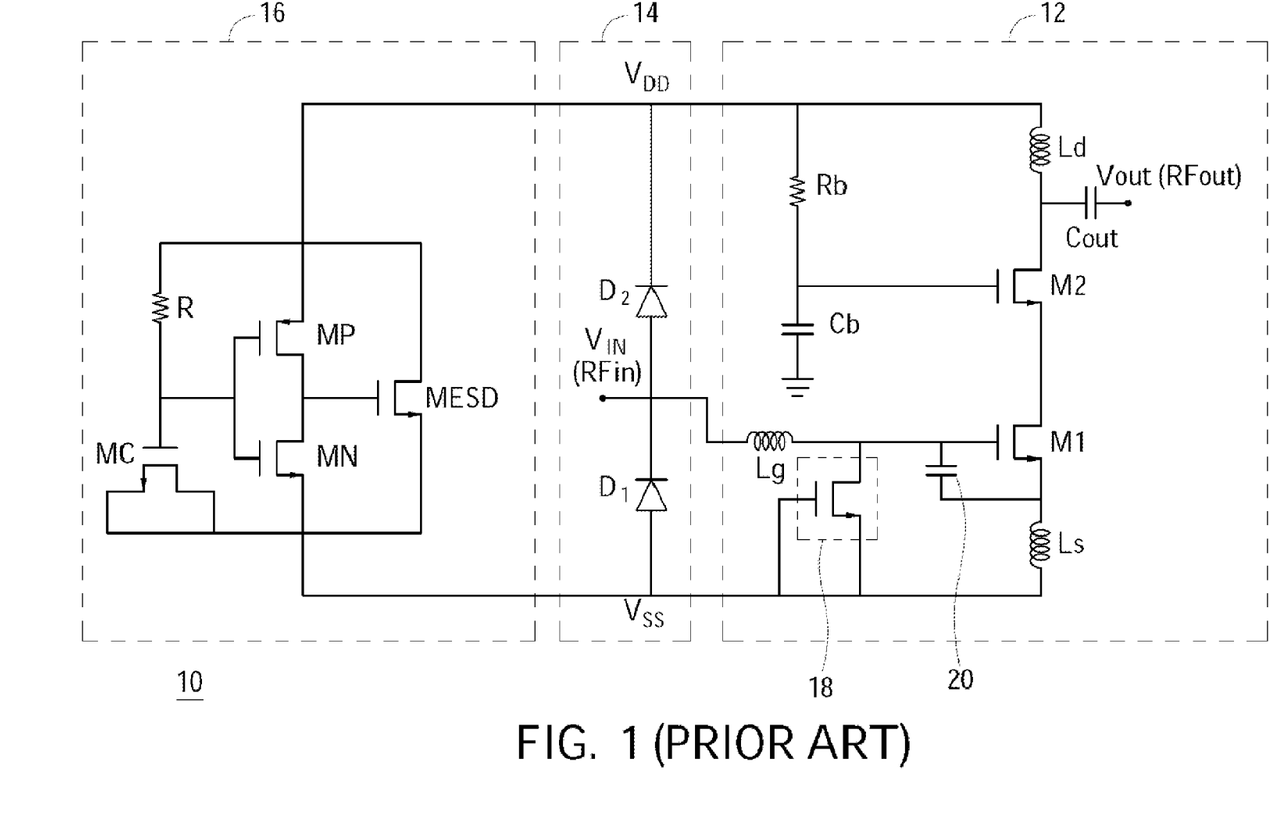
FIG. 1 is a circuit diagram of a prior art front-end RF circuit having primary ESD protection and secondary CDM ESD protection.

FIG. 1 portrays a prior art RFIC design 10 having a conventional ESD protection circuit (primary ESD protection) and secondary ESD protection for CDM. In the illustrated design 10, the ESD protection circuit includes a dual-diode rectifier circuit 14 with a power clamp 16 serving as primary ESD protection element for a RFIC, for example a low-noise amplifier (LNA) 12 as shown. More specifically, LNA 12 is configured as a source-degenerated CMOS cascode LNA. LNAs typically form the first stage of RF front-end circuits. With the double-diode configuration, one diode element is forward-biased and the other is reverse-biased during an ESD event, which can compensate for the voltage dependence of the diode parasitic capacitance and lessen the impact of the DC voltage swing. The power clamp is placed as close as possible to the RF input pins to reduce the interconnect resistance and the associated voltage drop. The secondary ESD protection is provided by a gate-grounded NMOS (GGN-MOS) device 18 in close proximity to the NMOS (M1) of the LNA 12. This GGNMOS secondary ESD protection approach has its deficiencies. For example, the large induced parasitic capacitance from the GGNMOS device 18 negatively impacts the RF performance, such as the noise figure. Moreover, the presence of the GGNMOS significantly impacts the impedance match along the signal path of the RF circuit.

The RF circuit of FIG. 1 also includes a capacitor 20 coupled between the gate and source of the NMOS transistor M1. The capacitor is provided for noise optimization under power-constrained simultaneous noise and input matching (PCINM). This design balances the contribution of the transistor noise and the noise due to the parasitic gate-circuit resistances. The extra gate-source capacitor gives an additional degree of freedom while taking the integrated inductor losses into account. Details of the use of this capacitor are provided in Belostotski, "Noise Figure Optimization of Inductively Degenerated CMOS LNAs with Integrated Gate Inductors", IEEE Transactions on Circuits and Systems-I: Regular Papers, Vol. 53, No. 7 (July 2006), the entirety of which is hereby incorporated by reference herein.

Figure 2:
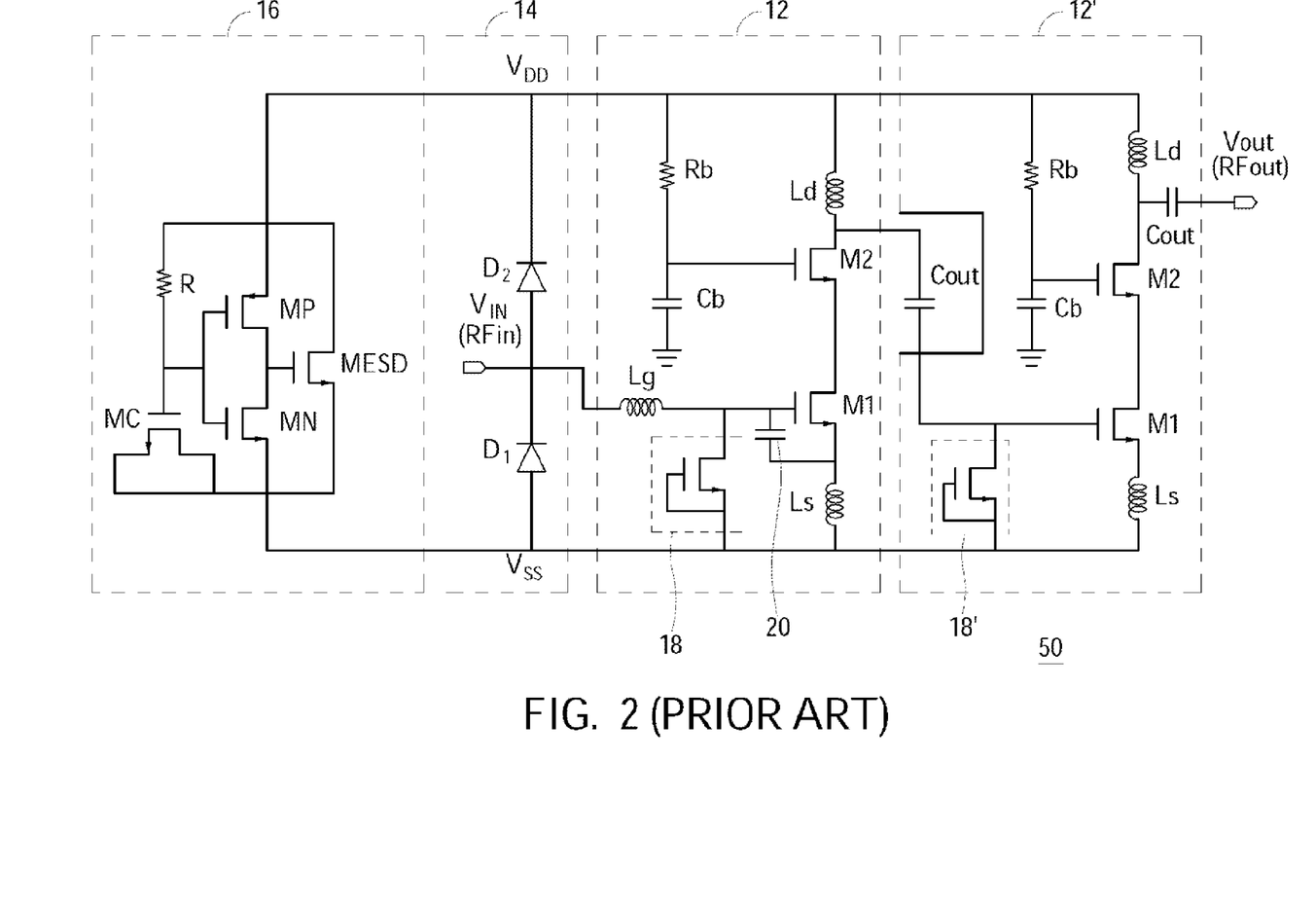
FIG. 2 is a circuit diagram of a prior art front-end multi-stage RF circuit having primary ESD protection and secondary CDM ESD protection.

FIG. 2 shows a prior art multi-stage RF circuit 50. Specifically, the RF circuit has cascaded amplifier stages 12 and 12'. Directly adding conventional CDM ESD protection in the form of the GGNMOS 18' impacts the input matching network and the inter-stage matching network, which significantly affects the RF performance.

SUMMARY OF THE INVENTION

A RF device includes a RF integrated circuit having a RF input and a RF output. The RF integrated circuit has an NMOS transistor having a gate terminal coupled to the RF input, a drain terminal coupled to a first power supply node and a source terminal coupled to a second power supply node. The RF integrated circuit is vulnerable to damage from an ESD event. A primary ESD protection circuit is coupled to the RF input and between the first and second power supply nodes. A secondary ESD protection circuit is coupled between the RF input and the second power supply node. The secondary ESD protection circuit includes a secondary ESD protection diode coupled between the gate and source terminals of the NMOS transistor.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

This description of the exemplary embodiments is intended to be read in connection with the accompanying drawings, which are to be considered part of the entire written description. Relative terms are for convenience of description and do not require that the apparatus be constructed or operated in a particular orientation. Terms concerning attachments, coupling, electrical communication and the like, such as "connected" and "interconnected," refer to a relationship wherein structures are secured, attached or communicate to or with one another either directly or indirectly through intervening structures, unless expressly described otherwise.

An ESD protection circuit for RF circuits is described below. In embodiments, the ESD protection circuit is designed to provide both noise optimization and secondary ESD protection for CDM. In certain embodiments, the ESD protection circuit provides both part of the primary ESD protection and secondary ESD protection for CDM.

Figure 3:
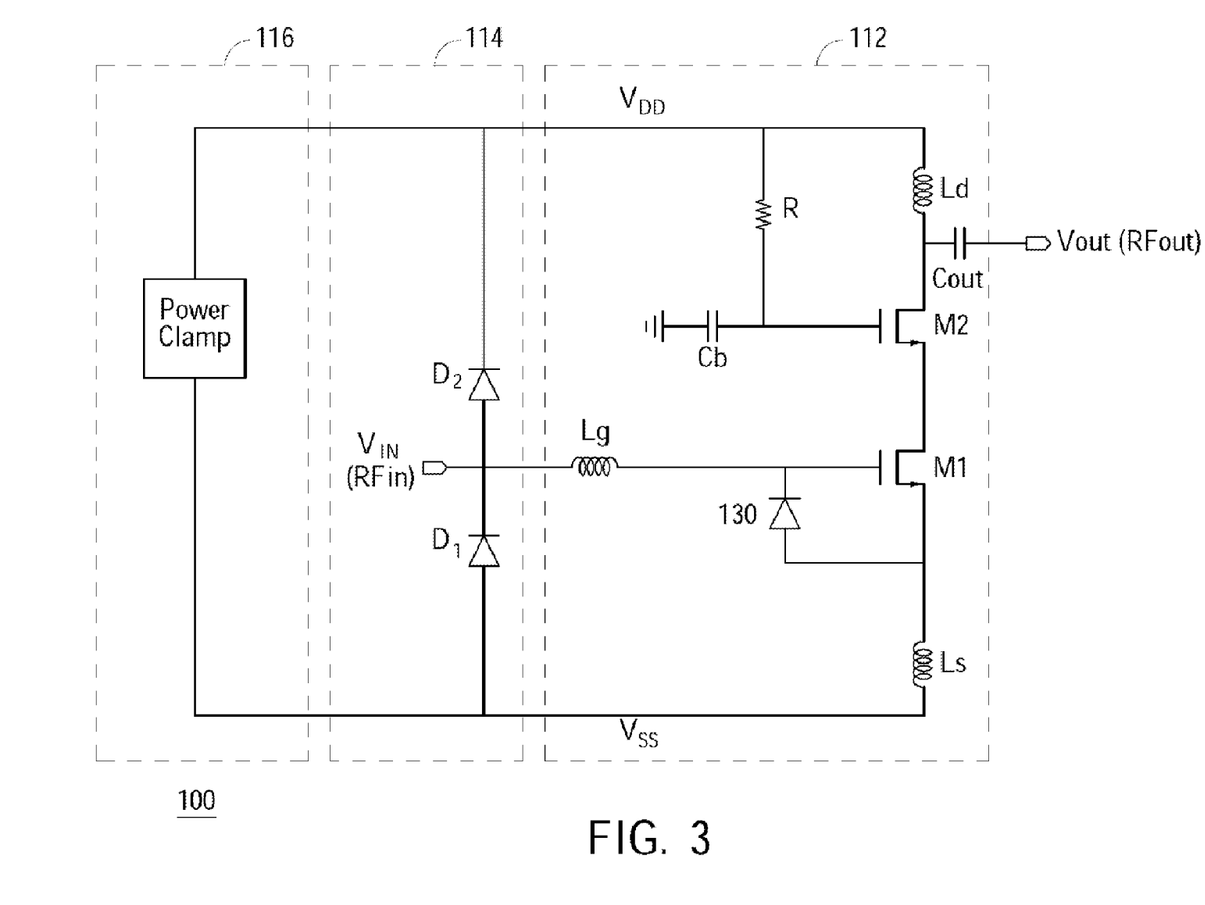
FIG. 3 is a circuit diagram of a front-end RF circuit having primary ESD protection and improved secondary CDM ESD protection according to an embodiment of the present invention.

FIG. 3 is a circuit diagram illustrating an exemplary embodiment of an ESD protection circuit in connection with a RF front end circuit 100, for example a LNA as described above. The RF circuit 100 includes a LNA 112 and a primary ESD protection circuit having a power clamp circuit 116 and a dual-diode circuit 114, which may be identical to or similar to circuits 12, 14 and 16 described above. In comparison to prior art RF circuit 10, the circuit 100 does not include GGNMOS transistor 18 or noise reducing capacitor 20. In one embodiment, these devices are replaced by a single diode 130 coupled between the source and gate terminals of NMOS M1. Specifically, the anode of the diode 130 is directly coupled to the source terminal of NMOS M1 above the source inductor Ls, and the cathode of the diode 130 is directly coupled to the gate terminal of the NMOS M1 between gate inductor Lg and the gate of NMOS M1. The single diode provides both CDM ESD protection and provides for noise optimization performance akin to that of prior art capacitor 20 and as described in Belostotski, which is incorporated by reference as discussed above. When operating in the reverse bias mode in the absence of an ESD event, the diode 130 has an inherent capacitance (Cgs). This capacitance provides the desired noise optimization discussed above during normal RF operation. During a CDM ESD event, the diode 130 is forward biased to provide ESD protection.

With the prior art circuit 10 of FIG. 1, inductor Ls was not in the current path for CDM ESD discharge. However, as can be seen with the embodiment illustrated in FIG. 3, there is now a current path from ground (VSS) to the RF input (RFIN) through inductor Ls, the diode 130 and inductor Lg. As such, both inductors Ls and Lg should be designed to survive the ESD event. For example, the inductors can be designed with sufficient metal width to withstand (i.e., not be burned out by) an expected ESD level. In embodiments, the inductors Ls and Lg have metal widths of at least 6 μm, and preferably of at 7 μm, so as to prevent burnout of the inductors by the ESD current flowing through the discharge path.

Figure 4:
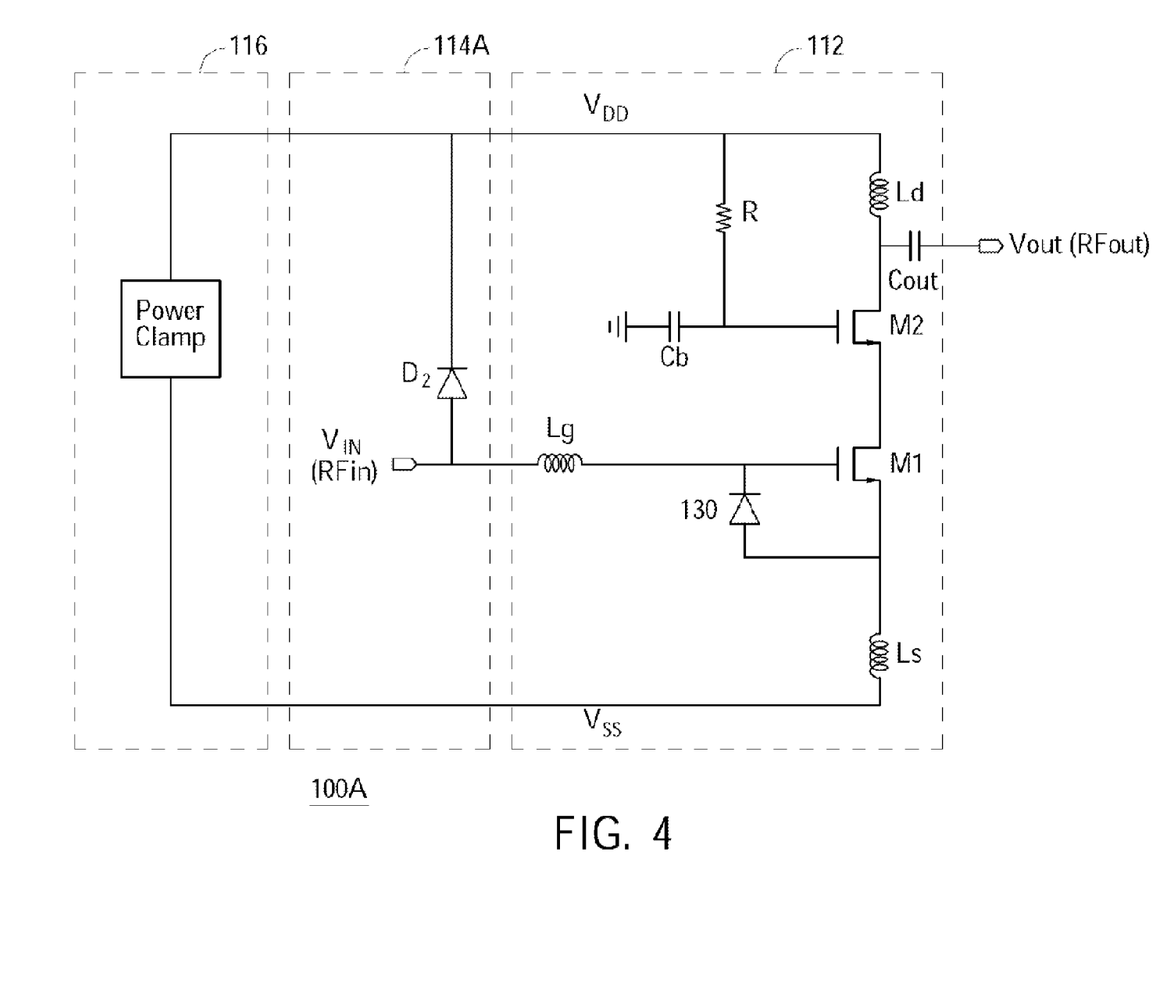
FIG. 4 is a circuit diagram of an alternative embodiment of the circuit of FIG. 3.

FIG. 4 is a circuit diagram illustrating an alternative embodiment of a RF front end circuit 100A having ESD protection. RF circuit 100A is identical in all respects to the RF circuit 100 of FIG. 3 except that the bottom diode D1 of the dual diode circuit has been removed. This alternative diode circuit is labeled as 114A. In this embodiment, aspects of the primary ESD protection are provided by the diode 130. When forward biased, the diode 130 provides both primary ESD protection, in cooperation with diode D2 of circuit 114A, and secondary ESD protection. When reverse biased, the diode 130 acts as a capacitor to provide for noise optimization during normal operation of the RF circuit. Moreover, diode D1 (FIG. 2) has an intrinsic capacitance and its metal routing has an intrinsic resistance, which result in a degraded noise figure and power loss in the RF circuit. Eliminating diode D1 and its metal routing can reduce this parasitic capacitance effect and power loss.

Figure 5:
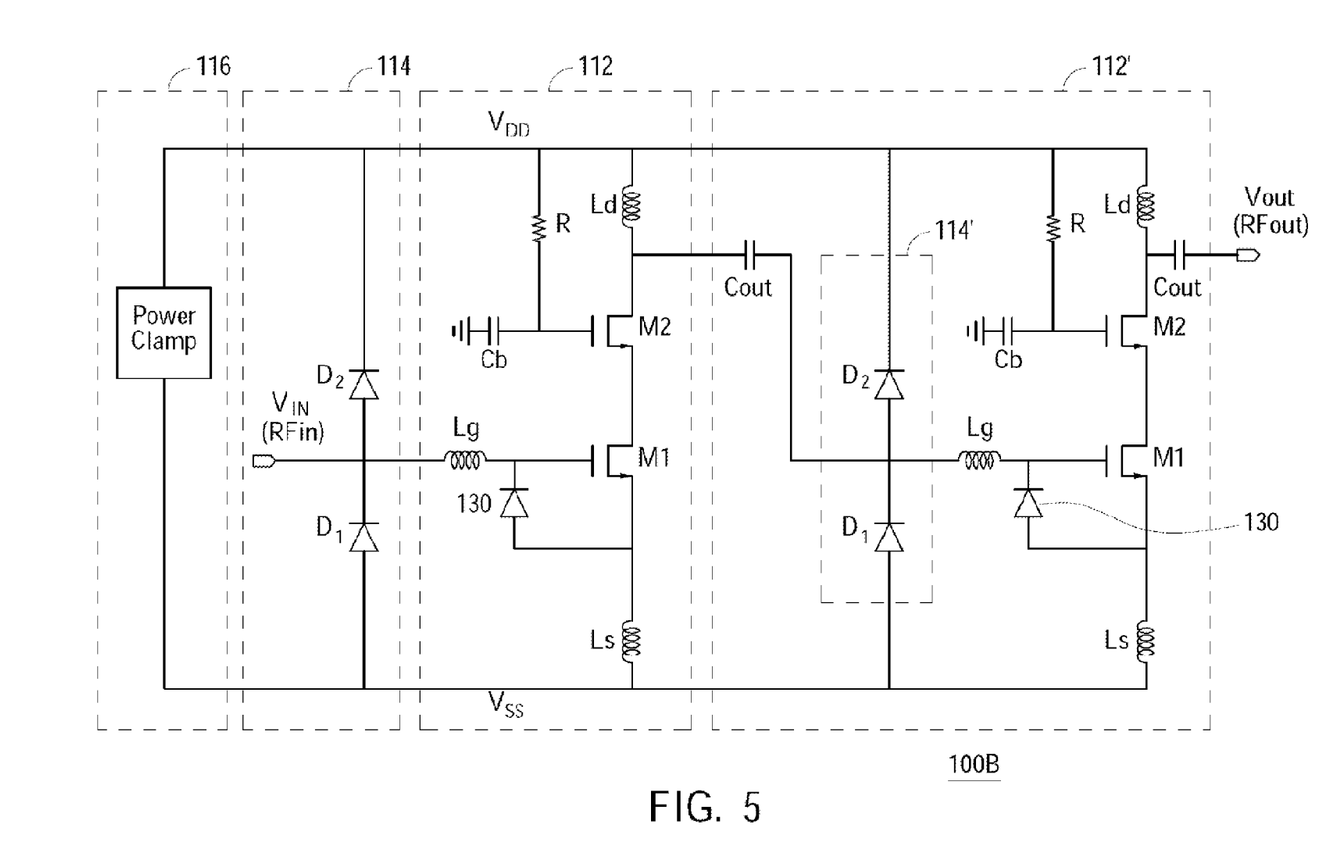
FIG. 5 is a circuit diagram of a multi-stage front-end RF circuit having primary ESD protection and improved secondary CDM ESD protection according to an embodiment of the present invention.

FIG. 5 is a circuit diagram of a multi-stage RF amplifier circuit 100B with built-in primary and secondary ESD protection. The circuit 100B includes power clamp circuit 116, first and second dual diode ESD protection circuits 114 and 114', cascaded amplifier circuits 112, 112' and first and second secondary ESD protection diodes 130. The second dual diode ESD protection circuit 114' includes a diode D2 connected between the input of amplifier 112' and the gate of NMOS M1 of amplifier 112', and a diode D1 connected between the input of amplifier 112' and ground. The second secondary ESD protection diode 130 of amplifier 112' is connected in the same manner as the first diode 130 directly to and across the gate and source of NMOS M1 of amplifier 112'. The dual diode circuit 114' provides primary ESD protection for the LNA 112', and the diode 130 provides secondary ESD protection (when forward biased) and noise optimization (when reversed biased) as described above.

Figure 6:
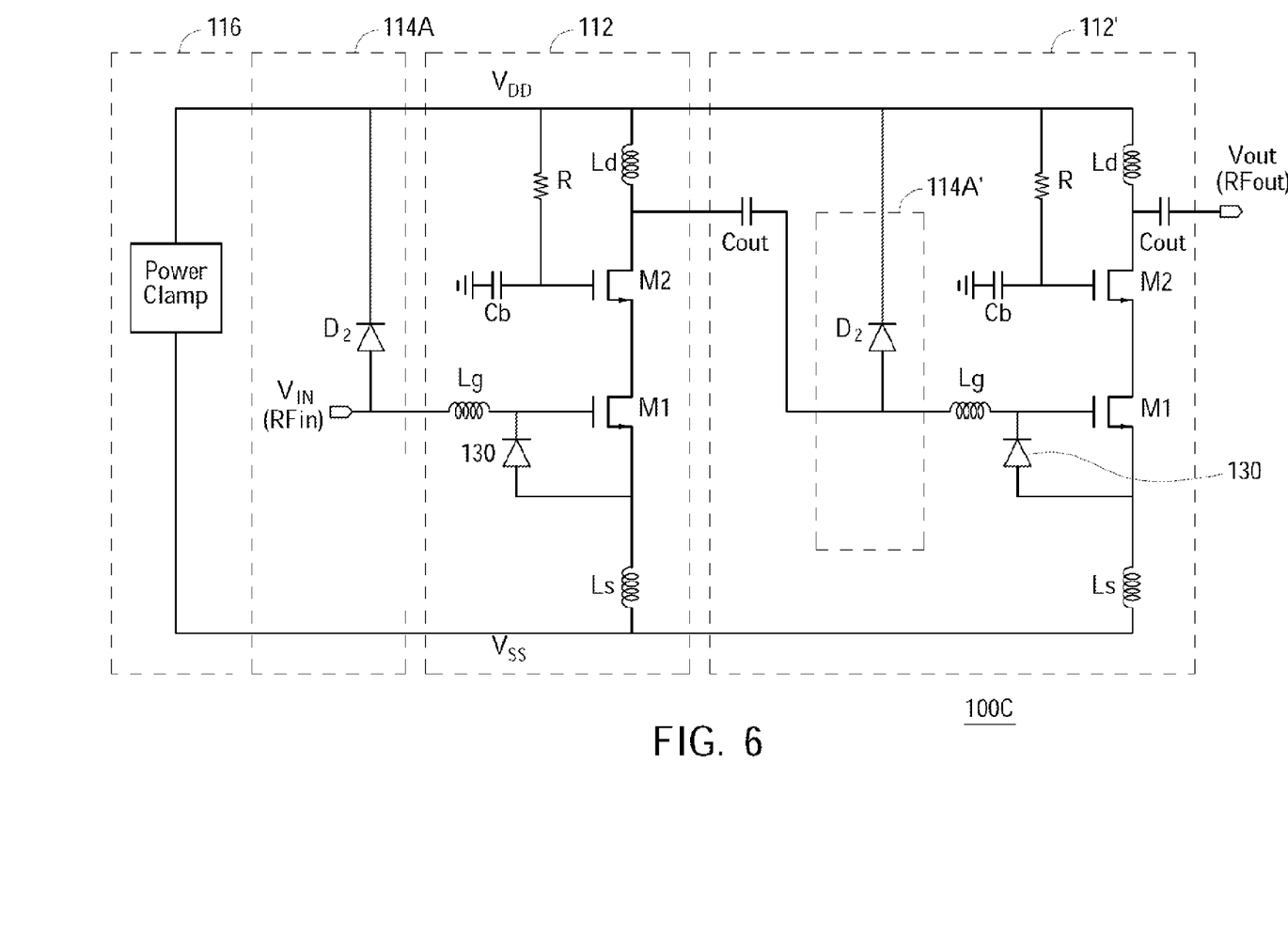
FIG. 6 is a circuit diagram of an alternative embodiment of the circuit of FIG. 5.

FIG. 6 is a circuit diagram of an alternative embodiment of a multi-stage RF amplifier circuit 100C with built-in primary and secondary ESD protection. The circuit is identical to the circuit 100B of FIG. 5 only diode D1 has been removed from the dual diode ESD protection circuits 114A and 114A' to reduce the parasitic capacitance effect as described above in connection with FIG. 4.

Though second LNA 112' is shown as having a gate inductor Lg, it should be realized that this second gate inductor is optional.

Figure 7:
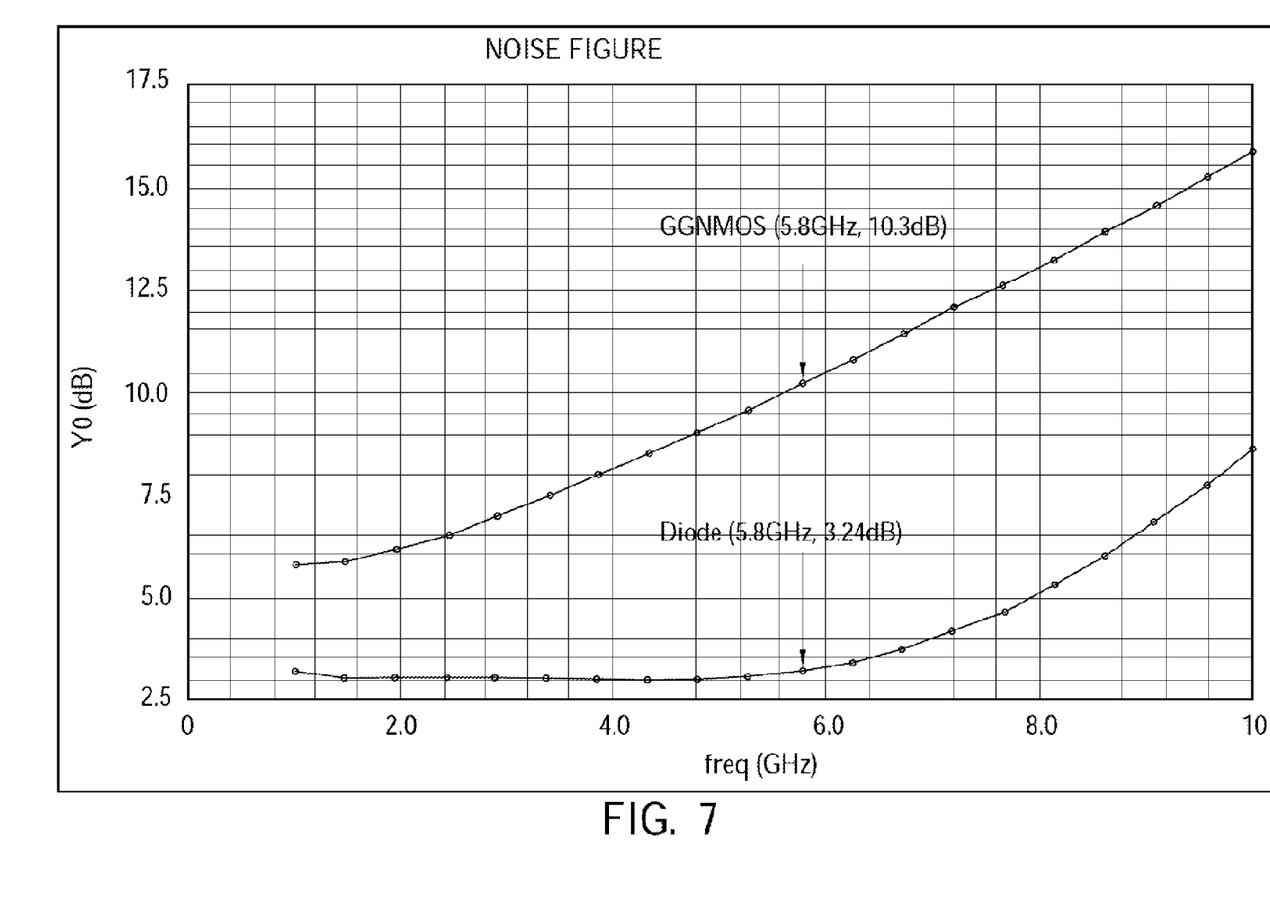
FIG. 7 is a graph depicting noise figures for a RF front-end circuit using conventional CDM ESD protection and CDM ESD protection according to an embodiment of the present invention.

FIG. 7 is a graph of simulation results comparing the noise figures for a LNA circuit having conventional GGNMOS secondary ESD protection as described above and for a LNA circuit as shown in FIG. 3 having ESD secondary protection in the form of a diode 130. When compared with circuits using conventional GGNMOS secondary ESD protection for CDM, the RF performance, illustrated by the noise figures of FIG. 7, can be greatly improved. The approach for secondary ESD protection described herein allows the circuit designer to optimize ESD and RF performance simultaneously by reducing parasitic capacitance. The diode 130 is designed for both RF performance and secondary ESD protection and can be treated as a matching network device during the design phase. Standard simulations can be used to optimize this single device's parameters for optimal RF performance. As shown in FIG. 7, the simulation confirmed the improved performance. At 5.8 GHz, the noise figure was reduced almost 70% from 10.3 dB to 3.24 dB.

Figure 8:
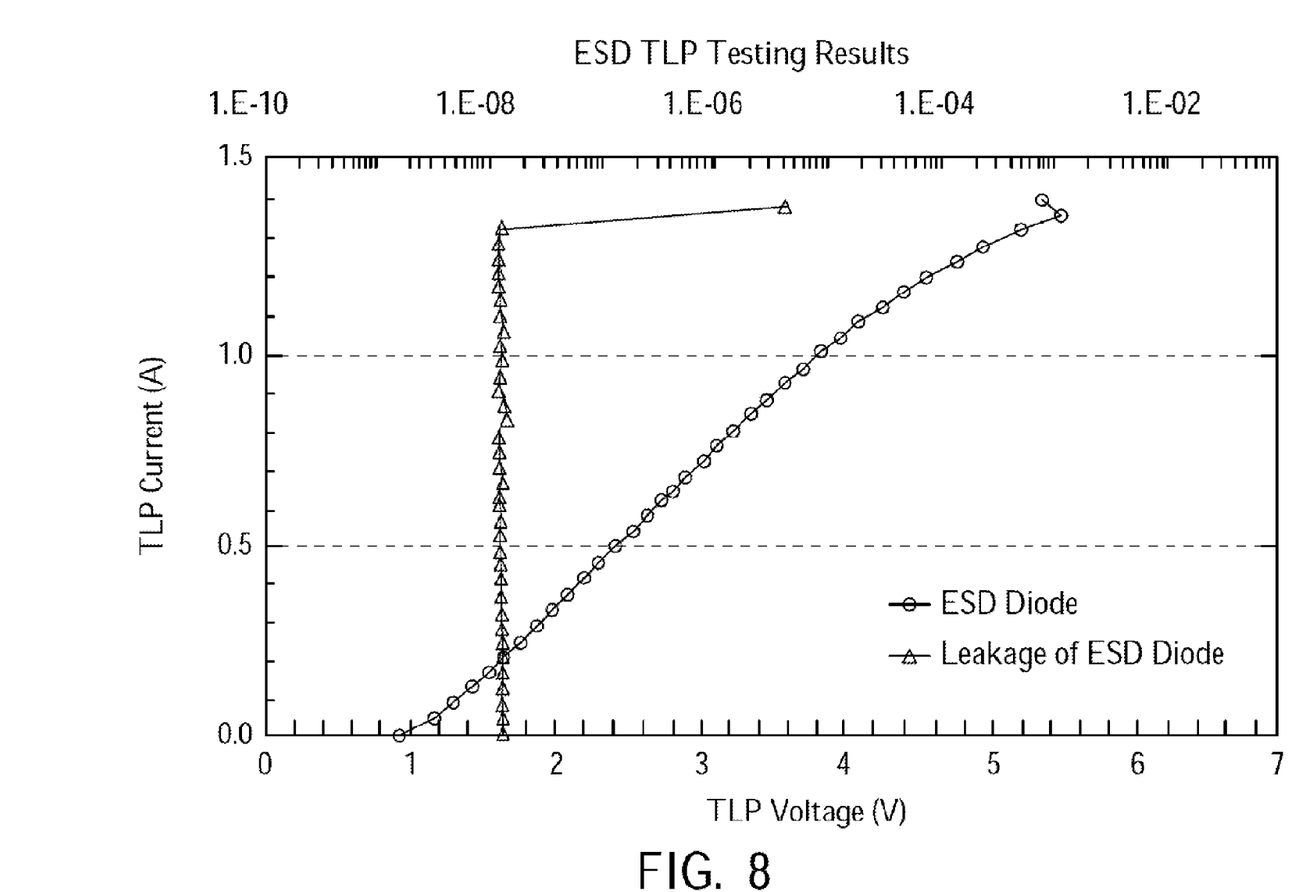
FIG. 8 is a graph showing results of ESD TLP (transmission line pulse) testing results.

FIG. 8 is a graph of ESD transmission line pulse (TLP) testing results. As those familiar with ESD tests will understand, TLP corresponds to an HBM ESD event and is not a specific test of performance under CDM. Nonetheless, the test is indicative of how a circuit will fair under CDM ESD events and demonstrates that the device can withstand ESD events with a high current (in the order of amperes). The graph depicts the I-V behavior of the disclosed device. The It2 current, i.e., the secondary breakdown current corresponding to the device fail point, is about 1.42 A, illustrating an ability to pass the required 2.0 kV of ESD (1.333 A×1.5 kohm).

The provision of secondary ESD protection has become very important for large die-size system-on-chip (SOC) applications used in today's RF application. These devices are particularly susceptible to CDM due to their large die sizes. As described above, the disclosed secondary ESD protection circuit provides for both CDM protection during ESD events and for noise optimization during normal operation while allowing for designs that reduce the effect of parasitic capacitances on RF performance and allow for improved matching of multi-stage designs. The ESD protection design is disclosed herein in connected with protection for RF front-end LNAs, it should be understood that the concepts described herein have broader application than simply LNAs and can be used to provide ESD protection for other RF devices having CDM ESD considerations, such as mixers, voltage controlled oscillators (VCOs), power amplifiers. Normally, ESD and RF performance is a trade-off. The secondary ESD protection diode can be added as an additional ESD clamp block to these RF device. The ESD protection scheme can be utilized in any number of applications, including, by way of example only, 2.4 GHz blue-tooth, Global Positioning Systems (GPS), wireless communications, 24 GHz ISM vehicle radar, 3-10.6 GHz UWB, 60 GHz UWB, and the like.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A RF device comprising:
   a RF integrated circuit having a RF input and a RF output, the RF integrated circuit including an NMOS transistor having a gate terminal coupled to the RF input, a drain terminal coupled to a first power supply node and a source terminal coupled to a second power supply node, the RF integrated circuit being vulnerable to damage from an ESD event;
   a primary ESD protection circuit coupled to the RF input and between the first and second power supply nodes; and
   a secondary ESD protection circuit coupled between the RF input and the second power supply node, the secondary ESD protection circuit comprising a secondary ESD protection diode coupled between the gate and source terminals of the NMOS transistor.

2. The RF device of claim 1, wherein the primary ESD protection circuit comprises a power clamp in parallel connection with a double diode ESD protection circuit.

3. The RF device of claim 2, wherein a first diode of the double diode ESD protection circuit is connected between the RF input and the first power supply node, and the secondary ESD protection diode operates as a second diode of the double diode ESD protection circuit during a primary ESD event.

4. The RF device of claim 3, wherein the secondary ESD protection diode is directly connected to the source and gate terminals of the NMOS transistor.

5. The RF device of claim 4, wherein the RF integrated circuit is a low-noise amplifier, the low-noise amplifier having a gate inductor coupled between the RF input and the gate of the NMOS transistor and a source inductor coupled between the source of the NMOS transistor and the second power supply node.

6. The RF device of claim 5, wherein the gate and source inductors are sized to withstand an expected secondary ESD event.

7. The RF device of claim 6, wherein inductors have metal line widths of at least 6 µm.

8. The RF device of claim 2,
   wherein the RF integrated circuit is a low-noise amplifier, the low-noise amplifier having a gate inductor coupled between the RF input and the gate of the NMOS transistor and a source inductor coupled between the source of the NMOS transistor and the second power supply node;
   wherein the secondary ESD protection diode is directly connected to the source and gate terminals of the NMOS transistor; and
   wherein the double diode ESD protection circuit includes a first diode connected between the RF input and the first power supply node, and a second diode connected between the RF input and the second power supply node.

9. The RF device of claim 8, wherein the gate and source inductors are sized to withstand an expected secondary ESD event.

10. The RF device of claim 9, wherein the gate and source inductors have metal line widths of at least 6 µm.

11. The RF device of claim 1, wherein the diode is directly connected to the source and gate terminals of the NMOS transistor.

12. A RF device with built-in charge device model (CDM) ESD protection comprising:
    a source degenerated cascode low-noise amplifier, the low-noise amplifier comprising a RF input, a RF output, a pair of cascoded NMOS transistors coupled between a power supply node and a ground node, a gate inductor coupled between the RF input and a gate of a bottom one of the cascoded NMOS transistors, and a source inductor coupled between the source of the bottom one of the cascoded NMOS transistors and the ground node; and
    a secondary ESD protection circuit comprising a secondary ESD protection diode coupled between and directly to the source terminal of the bottom one of the cascoded NMOS transistors and the gate node of the bottom one of the cascoded NMOS transistors,
    wherein the secondary ESD protection diode is forward biased during a CDM ESD event to provide a current path from the ground node through the ESD protection diode to the RF input node to protect the low-noise amplifier, and
    wherein in the absence of a CDM ESD event the ESD protection diode is reverse biased to provide a capacitance between the source and gate terminals of the bottom one of the cascoded NMOS transistors for noise factor optimization of the low-noise amplifier.

13. The RF device of claim 12, further comprising a primary ESD protection circuit coupled to the RF input and between the power supply node and the ground node, the primary ESD protection circuit including a dual diode structure coupled to the RF input.

14. The RF device of claim 13, wherein the dual diode structure includes a first diode connected between the RF input and the power supply node and the secondary ESD protection diode, the secondary ESD protection diode providing both primary and secondary ESD protection.

15. The RF device of claim 13, wherein the dual diode structure includes a first diode connected between the RF input and the power supply node and a second diode connected between the RF input and the ground node.

16. The RF device of claim 12, wherein the gate and source inductors are sized to withstand an expected secondary ESD event.

17. The RF device of claim 16, wherein the gate and source inductors have metal line widths of at least 6 µm.

18. A RF device with built-in primary ESD protection and charge device model (CDM) secondary ESD protection comprising:
    at least first and second low-noise amplifier stages in a cascaded connection between a RF input and a RF output;
    the first low-noise amplifier stage comprising a first pair of cascoded NMOS transistors coupled between a power supply node and a ground node, a gate inductor coupled between the RF input and a gate of a bottom one of the cascoded NMOS transistors, and a first source inductor coupled between the source of the bottom one of the cascoded NMOS transistors and the ground node;

the second low-noise amplifier stage including a second pair of cascoded NMOS transistors coupled between the power supply node and the ground node, a gate coupled to an output of the first low-noise amplifier stage, and a second source inductor coupled between the source of the bottom one of the cascoded NMOS transistors of the second low-noise amplifier stage and the ground node;

a primary ESD protection circuit coupled to the RF input and between the first and second power supply nodes;

a first secondary ESD protection diode coupled between and directly to the source terminal of the bottom one of the cascoded NMOS transistors of the first low-noise amplifier stage and the gate node thereof; and a second secondary ESD protection diode coupled between and directly to the source terminal of the bottom one of the cascoded NMOS transistors of the second low-noise amplifier stage and the gate node thereof;

wherein the secondary ESD protection diodes are forward biased during a CDM ESD event to provide a current path from the ground node through the secondary ESD protection diodes to protect the low-noise amplifier stages, and wherein in the absence of a CDM ESD event the secondary ESD protection diodes are reverse biased to provide a capacitance between the source and gate terminals of the bottom ones of the cascoded NMOS transistors for noise factor optimization of the low-noise amplifier stages.

19. The RF device of claim 18, wherein the primary ESD protection circuit comprises:

a first double diode ESD protection circuit including a diode connected between the RF input and the power supply node, and the first secondary ESD protection diode operates as a second diode of the first double diode ESD protection circuit during a primary ESD event, and a second double diode ESD protection circuit including a diode connected between the output of the first low-noise amplifier stage and the power supply node, and the second secondary ESD protection diode operates as a second diode of the second double diode ESD protection circuit during the primary ESD event.

20. The RF device of claim 19, further comprising a power clamp circuit coupled in parallel with the first and second double diode ESD protection circuits between the power supply and ground nodes.

* * * * *